United States Patent [19]
Chen et al.

[11] Patent Number: 6,144,666
[45] Date of Patent: Nov. 7, 2000

[54] TECHNIQUE FOR EFFICIENTLY TRANSPORTING INFORMATION THROUGH AN ASYNCHRONOUS TRANSFER MODE (ATM) NETWORK

[75] Inventors: Xiaoqiang Chen, Eatontown; Vijay Pochampalli Kumar, Freehold, both of N.J.; Cauligi Srinivasa Raghavendra, Pullman, Wash.; Ramanathan Venkateswaran, Chicago, Ill.

[73] Assignee: Lucent Technologies Inc., Murray Hill, N.J.

[21] Appl. No.: 08/954,759

[22] Filed: Oct. 20, 1997

Related U.S. Application Data

[60] Provisional application No. 60/043,842, Apr. 11, 1997.

[51] Int. Cl.[7] .................................................... H04L 12/50
[52] U.S. Cl. .......................................... 370/395; 370/410
[58] Field of Search ..................................... 370/397, 395, 370/399, 409, 411, 413, 410, 445

[56] References Cited

U.S. PATENT DOCUMENTS

| | | | |
|---|---|---|---|
| 5,099,475 | 3/1992 | Kozaki et al. | 370/422 |
| 5,544,169 | 8/1996 | Norizuki et al. | 370/395 |
| 5,592,476 | 1/1997 | Calamvokis et al. | 370/390 |

OTHER PUBLICATIONS

R. Venkateswaran et al., "Support for Group Multicast in PNNI," ATM Forum/97–0076, Feb. 1997, pp. 1–26.

R. Venkateswaran et al., "Support for Multiway Communications in ATM Networks," ATM Forum/97–036, Apr. 1997, pp. 1–9.

E. Gauthier et al., "SMART: A Many–to–Many Multicast Protocol for ATM," ATM Forum/96–1295, Oct. 1996, pp. 1–7.

M. Grossglauser et al., "SEAM: A Scheme for Scalable and Efficient ATM Multipoint–to–Multipoint Communication," ATM Forum/96–1142, Aug. 1996.

R. Venkateswaran et al., "Hierarchical Multicast Routing in ATM Networks," *IEEE Intl. Conf. on Communications*, vol. 3, Jun. 1996, pp. 1690–1694.

R. Venkateswaran et al., "A Scalable, Dynamic Multicast Routing Algorithm in ATM Networks," *IEEE Intl. Conference on Communications*, Jun. 1997.

R. Woundy et al., "ARIS: Aggregate Route–Based IP Switching," Internet–Draft, Nov. 1996.

G. Armitage, "Support for Multicast over UNI 3.0/3.1 based ATM Networks," Network Working Group, rfc2002, Nov. 1996.

*Primary Examiner*—Huy D. Vu
*Assistant Examiner*—Alexander Boakye

[57] ABSTRACT

In an asynchronous transfer mode (ATM) communications system, all ATM switches in a multicast connection perform virtual path (VP) switching except those merge points which perform virtual channel (VC) switching to avoid VCI collisions. The merge points are ATM switches which can merge ATM traffic from at least two incoming links into an outgoing link. In a second approach, each merge point in a multicast connection performs VP switching, and dynamically dispenses VC switching when a VCI collision is detected. Specifically, to prevent further VCI collision, incoming ATM cells indicated by an odd VPI value are VC switched by the merge point while those indicated by an even VPI value are VP switched thereby.

44 Claims, 6 Drawing Sheets

| IN | | OUT-PORT 2 |
|---|---|---|
| IN-PORT | VPI | VPI |
| 1 | 20 | 30 |
| 3 | 140 | 30 |

501 — row (1, 20, 30)
502 — row (3, 140, 30)

FIG. 5B

| IN | | OUT-PORT 3 |
|---|---|---|
| IN-PORT | VPI | VPI |
| 1 | 20 | 40 |

503 — row (1, 20, 40)

FIG. 6A

| IN | | OUT-PORT 1 |
|---|---|---|
| IN-PORT | VPI | VPI |
| 3 | 70 | 140 |

FIG. 6B

| IN | | OUT-PORT 2 |
|---|---|---|
| IN-PORT | VPI | VPI |
| 1 | 40 | 50 |
| 3 | 70 | 50 |

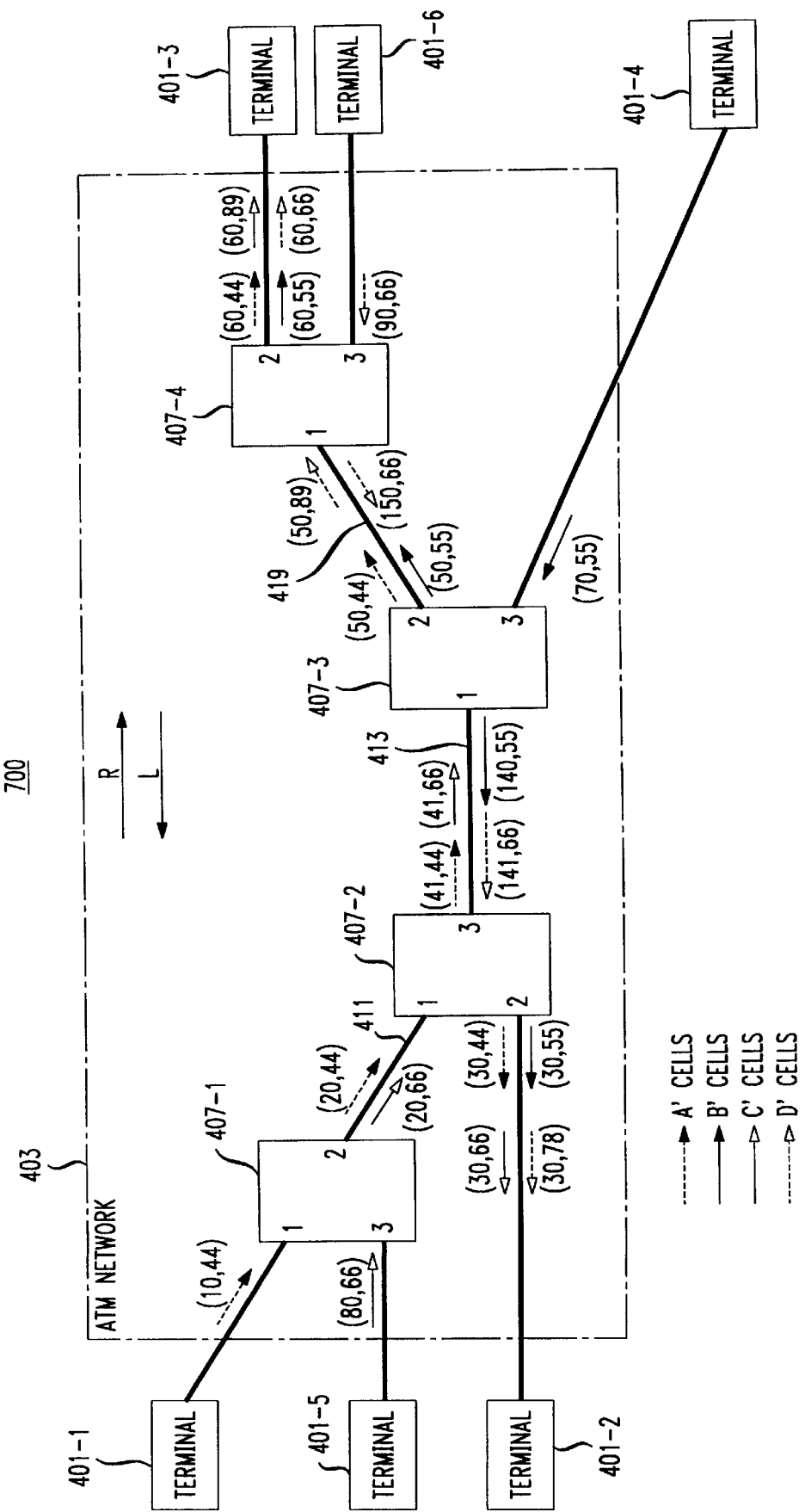

FIG. 8

| IN || OUT-PORT 3 |
|---|---|---|
| IN-PORT | VPI | VPI |
| 1 | 20 | 41 |

FIG. 9

| IN || | OUT-PORT 2 ||
|---|---|---|---|---|
| IN-PORT | VPI | VCI | VPI | VCI |
| 1 | 41 | 44 | 50 | 44 |
| 1 | 41 | 66 | 50 | 89 |

FIG. 10

| IN || OUT-PORT 1 |
|---|---|---|
| IN-PORT | VPI | VPI |
| 3 | 70 | 140 |
| 2 | 150 | 140 |

| IN || OUT-PORT 1 |
|---|---|---|
| IN-PORT | VPI | VPI |
| 3 | 70 | 140 |
| 2 | 150 | 141 |

| IN || | OUT-PORT 2 ||
|---|---|---|---|---|
| IN-PORT | VPI | VCI | VPI | VCI |
| 3 | 141 | 66 | 30 | 78 |

TECHNIQUE FOR EFFICIENTLY TRANSPORTING INFORMATION THROUGH AN ASYNCHRONOUS TRANSFER MODE (ATM) NETWORK

This application claims benefit of provisional application No. 60/043,842 filed Apr. 11, 1997.

FIELD OF THE INVENTION

The invention relates to communications techniques, and more particularly to a technique for transporting information through an asynchronous transfer mode (ATM) network in a multicast connection.

BACKGROUND OF THE INVENTION

Asynchronous transfer mode (ATM) technology was recently developed to realize an efficient information transport through a communications network. The popularity of an ATM transport stems from the fact that no resource specialization is needed in an ATM network. All network resources are efficiently shared by different services. Moreover, the ATM network can generally accommodate such services irrespective of the service characteristics such as their bit rates, quality requirements or data burstiness.

The ATM transport is cell based. Information to be transmitted through the network is packaged in units of cells each comprising a header and an information field. The cell header affords a limited number of functions, which is conducive to fast cell processing by ATM switches in the network. One of these functions involves identification of a virtual connection between ATM switches or between a switch and a terminal, through which the cell is transported. In a well known manner, the virtual connection is identified by a virtual path identifier (VPI) field and a virtual channel identifier (VCI) field in the cell header. In particular, the VPI field identifies a statically allocatable link of the virtual connection, and the VCI field identifies a dynamically allocatable channel thereof within such a link.

One of the major advantages of the ATM transport is allowing interleaving of ATM cells from different sources (or senders) on each link, thereby efficiently utilizing the network bandwidth. Cell interleaving is realizable when cells from each source are assigned a respective VPI/VCI combined value corresponding to a particular virtual connection, through which the cells are transported.

In a prior art ATM network, an ATM switch operates in either the virtual path (VP) switching mode or virtual channel (VC) switching mode. In the VP switching mode, an ATM switch only switches on the VPI field of an incoming cell. That is, the ATM switch translates only the VPI value of the incoming cell, without regard to the VCI value. The translated VPI value identifies a different link to which the cell is switched. On the other hand, in the VC switching mode, an ATM switch switches on both the VPI and VCI fields of an incoming cell. The translated VPI and VCI values identify a different link and channel, respectively, to which the cell is switched.

The VP switching mode is preferred to the VC switching mode because, among other reasons, the former affords a higher switching speed than the latter. However, in a multicast connection, i.e., a multipoint-to-point or multipoint-to-multipoint connection, an ATM switch operating in a VP switching mode may cause a "VCI collision" when the switch merges traffic on two or more incoming links into an outgoing link. Such a switch is referred to as a "Merge Point." A VCI collision occurs when in a particular multicast connection, cells from different sources on two or more incoming links coincidentally bearing the same VCI value (but different VPI values) are VP switched and merged into the same outgoing link. That is, the ATM switch translates the respective VPI values of the incoming cells to the same VPI value corresponding to that outgoing link. As a result, albeit from different sources, these cells after the VP merging are interleaved and bear the same VPI and VCI values indicating the same source. Consequently, receivers at the other end of the network fail to properly reassemble the cells from the respective sources, which is unacceptable.

In prior art, to prevent VCI collisions in a multicast connection, ATM cell interleaving is restricted or even prohibited. For example, a token passing scheme has been applied to prevent multiple senders from sending data through the network at the same time. Such a scheme is described in: E. Gauthier et al., "SMART: A Many-to-Many Multicast Protocol for ATM," ATM Forum draft 96-1295, 1996. In accordance with this scheme, a sender in possession of the token is allowed to send information in multiples of packets (not cells) at a time. As such, the ATM cells representing the packets are transmitted contiguously to one another, thereby avoiding interleaving with cells from other senders. However, the above scheme is not desirable in that, among other things, the requirement that each sender wait for its turn to transmit packets may compromise individual performances such as the respective delay requirements.

In another prior art approach called the VC-Merge approach, each merge point is required to buffer ATM cells for the same multicast connection representative of respective packets from different senders, and a switch scheduler is used to ensure that no interleaving of the cells from different senders is allowed on the same outgoing link. To that end, an end-of-packet bit (EOP-bit) is used in a packet to indicate its end. Upon detection of such a bit, the ensemble of the buffered cells representative of that packet is scheduled to be released from the merge point onto the outgoing link. Thus, in this instance, the merge point in effect performs interleaving of packets from different senders, as opposed to cell interleaving for which the ATM transport is advantageous. For details on the implementation of the VC-Merge approach, one may refer to: M. Grossglauser et al., "SEAM: A Scheme for Scalable and Efficient ATM Multipoint-to-Multipoint Communication," ATM Forum draft 96-1142, 1996. It is apparent that this approach undesirably requires a large number of buffers at a merge point, which varies with the number of senders. Concomitant to the extensive buffer requirement is low data throughput afforded by the VC-Merge approach. Moreover, the packet interleaving is relatively inefficient in bandwidth utilization, with respect to cell interleaving.

Accordingly, there exists a need for a methodology for efficiently transporting information through an ATM network in a multicast connection. Such a methodology must be conducive to effective utilization of the network bandwidth, provision of high data throughput, and avoidance of long transmission delays.

SUMMARY OF THE INVENTION

In accordance with the invention, in an ATM network each ATM switch except a merge point in a multicast connection can always perform VP switching. In an inventive VCI collision avoidance approach, the merge point performs VC switching in accordance with the invention on each incoming information cell in the multicast connection. In an inventive VCI collision detection approach, the merge point performs VP switching on each incoming information cell until a VCI collision is detected. At such time, the merge point starts performing VC switching in accordance with the invention on selected incoming information cells to prevent further collisions.

Advantageously, either inventive approach affords cell interleaving in a multicast connection, thereby effectively utilizing the network bandwidth, providing high data throughput and improving transmission delays with respect to the prior art.

BRIEF DESCRIPTION OF THE DRAWING

In the drawing,

FIG. 1 is a block diagram of an ATM communications system in accordance with an inventive VCI collision avoidance approach;

FIGS. 5A and 5B illustrate respective VP tables used in an ATM switch in the system of FIG. 4;

FIGS. 6A and 6B illustrate respective VP tables used in a second ATM switch in the system of FIG. 4;

FIG. 7 is a block diagram of a second ATM communications system in accordance with the inventive VCI collision detection approach;

FIG. 8 illustrates a VP table used in a first ATM switch in the system of FIG. 7;

FIG. 9 illustrates a VC table used in a second ATM switch in the system of FIG. 7;

FIGS. 10 and 11 illustrate respective VP tables used in the second ATM switch in the system of FIG. 7; and FIG. 12 illustrates a VC table used in the first ATM switch in the system of FIG. 7.

Throughout this disclosure, unless otherwise stated, like elements, components and sections in the figures are denoted by the same numerals.

DETAILED DESCRIPTION

Figure 1:
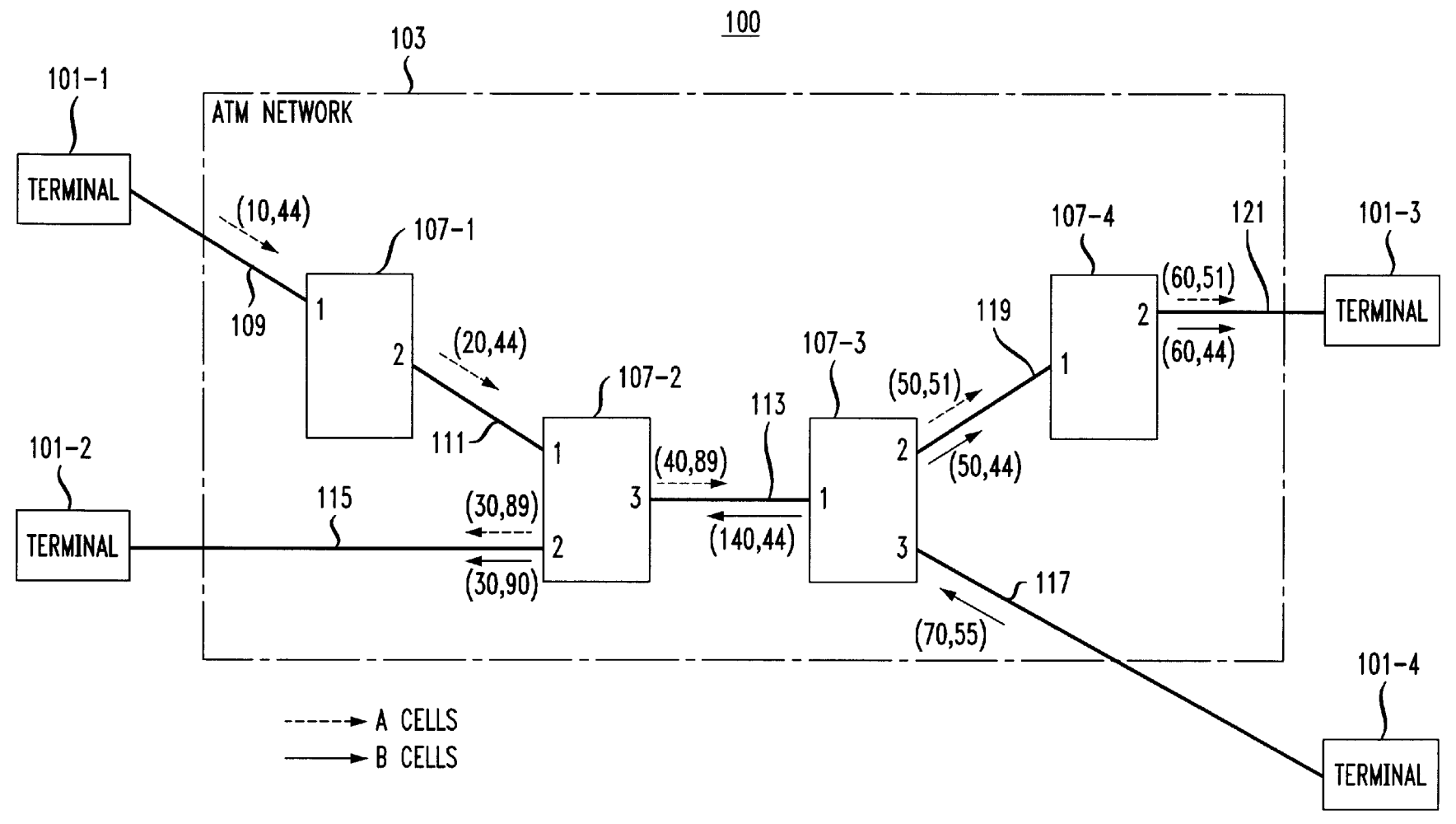

FIG. 1 illustrates communications system 100 embodying the principles of the invention. Without loss of generality, system 100 includes terminals 101-1 through 101-4 which are connected to asynchronous transfer mode (ATM) network 103. Network 103 in this instance is arranged in a multipoint-to-multipoint configuration and used to provide a multicast connection. By way of example, network 103 includes ATM switches 107-1 through 107-4 which operate in a manner according to the invention. Through network 103, terminals 101-1 through 101-4 may communicate packets (or messages) to one another to realize various services such as video conferencing and distributed interactive simulations.

Figures 2, 3:
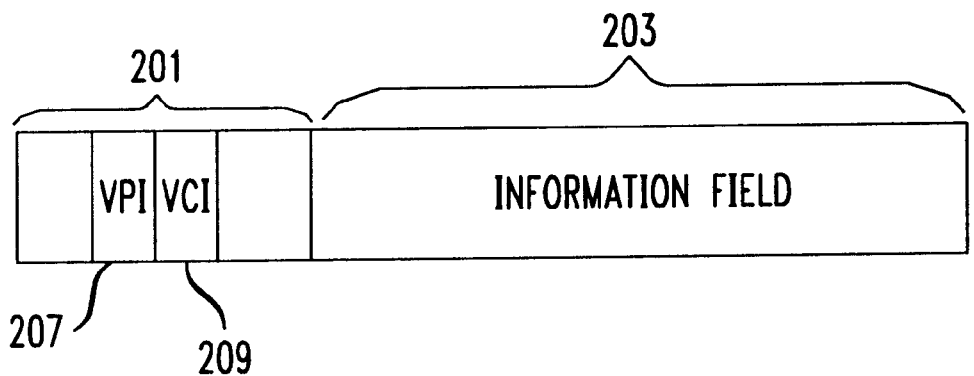
FIG. 2 illustrates a generic ATM cell used in the system of FIG. 1.
FIG. 3 illustrates a VC table used in an ATM switch in the system of FIG. 1.

The transport of the above packets through network 103 is in accordance with a cell-based ATM transport. FIG. 2 shows representative ATM cell 200 used in the transport. As shown in FIG. 2, cell 200 comprises ATM header 201 which is five bytes long, and information field 203 which is 48 bytes long. The ATM transport is preferable here in that it accommodates each service irrespective of the service characteristics such as its bit rates, quality requirements or data burstiness, within reasonable limits. Moreover, ATM operates in a connection-oriented mode to ensure a minimal loss of cells. That is, before ATM cells are transferred from a terminal to network 103, in a call setup the terminal needs to request an end-to-end connection for routing the cells through the network. In response, the network attempts to reserve all the necessary resources to establish the connection. If insufficient resources are available, the connection request is denied.

In the ATM transport, each packet to be transmitted is partitioned into multiple segments, each of which is at most 48 bytes long. Each segment is contained in the information field, e.g., information field 203, of an ATM cell. ATM header 201 affords a limited number of functions, which is conducive to fast processing of cell 200 in the network. One of these functions involves identification of a virtual connection between ATM switches or between an ATM switch and a terminal, through which the cell is transported. The virtual connection is identified by a virtual path identifier (VPI) 207 which is 12 bits long, and virtual channel identifier (VCI) 209 which is 16 bits long. In particular, VPI 207 identifies a statically allocatable link of the virtual connection, and VCI 209 identifies a dynamically allocatable channel thereof within such a link.

It should be noted that the VPI/VCI values only have a local significance on a given link and may be translated by ATM switches 107-1 through 107-4 from link to link. Relying on use of different VCI values (or channels) corresponding to the respective transmitting terminals on each link, cells from a terminal are distinguishable from those from another terminal on the same link. Thus, despite interleaving of cells on certain links, based on the different VCI values in the cells, the receiving terminals manage to reassemble them according to the respective transmitting terminals.

In prior art, an ATM switch implements either VP switching or VC switching. In VP switching, the ATM switch only switches on the VPI field of an incoming cell. That is, each ATM switch translates only the VPI value of the incoming cell, without regard to the VCI value. The translated VPI value identifies a different link to which the cell is switched. On the other hand, in VC switching, each ATM switch switches on both the VPI and VCI fields of an incoming cell. The translated VPI and VCI values identify a different link and channel, respectively, to which the cell is switched.

The VP switching is traditionally preferred to the VC switching because, among other reasons, the former affords a higher switching speed than the latter. However, in a multicast connection, an ATM switch performing VP switching may cause a "VCI collision" when the switch merges traffic on two or more incoming links into an outgoing link. Such a switch is referred to as a "Merge Point." A VCI collision occurs when in a particular multicast connection, cells from different sources on two or more incoming links coincidentally bearing the same VCI value (but different VPI values) are VP switched and merged into the same outgoing link. That is, the ATM switch translates the respective VPI values of the incoming cells to the same VPI value corresponding to that outgoing link. As a result, albeit from different sources, these cells after the VP merging are interleaved and bear the same VPI and VCI values indicating the same source. Consequently, receivers at the other end of the network fail to properly reassemble the cells from the respective sources, which is unacceptable.

In accordance with the invention, to avoid a VCI collision in a multicast connection, all ATM switches in an ATM network perform VP switching except the merge points which perform VC switching in a manner to be described. Referring back to FIG. 1, in this example, terminals 101-1 and 101-4 transmit ATM cells to network 103 and are thus transmitting terminals. On the other hand, terminals 101-2 and 101-3 receive ATM cells from network 103 and are thus receiving terminals. In this instance, terminals 101-1 through 101-4 are engaged in a multicast connection since as fully described below each of the receiving terminals receives ATM cells from more than one transmitting terminal.

In this instance, all links in network 103 are unidirectional except link 113 which is bidirectional. As shown in FIG. 1, the travel direction of the cells from terminal 101-1 on each link is indicated by a dash-line arrow. Cells from terminal 101-1 hereinafter are referred to as "A cells." In addition, the travel direction of the cells from terminal 101-4 on each link is indicated by a solid-line arrow. Cells from terminal 101-4 hereinafter are referred to as "B cells."

The A cells traverse link 109 from terminal 101-1 to switch 107-1. Illustratively, link 109 and the channel therein used by the A cells are designated a VPI value "10" and a VCI value "44", respectively. These VPI and VCI values are shown in FIG. 1 in parentheses as an ordered pair, and reflected in the respective fields in the header of each A cell.

Link 109 terminates at in-port 1 of switch 107-1. Because in this instance switch 107-1 has only one input link, i.e., link 109, switch 107-1 is not a merge point. As such, in accordance with the invention, switch 107-1 performs VP switching. Specifically, according to the routing of the A cells determined in an initial call setup, switch 107-1 switches on the VPI field of the A cells, and translates their VPI value from "10" to "20" in this instance, leaving the VCI value "44" alone. Switch 107-1 then transfers the A cells through out-port 2 onto link 111 identified by the VPI value "20". As shown in FIG. 1, the A cells on link 111 now bear the VPI and VCI values of "20" and "44", respectively.

Switch 107-2 in this instance is a merge point as this switch may receive incoming A and B cells from links 111 and 113, respectively, and merge them into outgoing link 115. As mentioned before, VP switching by a merge point in a multicast connection may result in a VCI collision, which is unacceptable. Indeed, in this instance, the A cells from link 111 coincidentally bear the same VCI value (i.e., "44") as the B cells from link 113. Had switch 107-2 performed VP switching, a VCI collision would have occurred. That is, those A and B cells routed to link 115 would have borne the same VPI value identifying link 115 and VCI value "44", indistinguishable as to their sources.

However, the above VCI collision is avoided by having the merge point (e.g., switch 107-2) perform VC switching in accordance with the invention. To that end, the merge point translates both the VPI and VCI values of incoming cells, and ensures that the translated VCI values of the interleaved cells on an outgoing link are different for their respective sources. Since a VCI value has only a local significance between switches or between a switch and a terminal, the merge point in accordance with the invention locally maintains a list of available VCI values, and assigns an unused VCI value to cells from each transmitting terminal newly joining the network.

Specifically, switch 107-2 maintains a list of available VCI values and a VC table in a memory (not shown) keeping track of the VCI assignment. In this instance, switch 107-2 has a capacity to assign VCI values from "50" to "99." When terminal 101-1 requests to join network 103 in a call setup, switch 107-2 creates appropriate entries in the VC table for this transmitting terminal. The resulting table denoted 300 is illustrated in FIG. 3. According to the pre-established routing, switch 107-1 needs to transfer a copy of the A cells on link 111 to link 113 identified by a VPI value "40", and another copy of the A cells to link 115 identified by a VPI value "30". In accordance with the invention, a processor (not shown) in switch 107-2 consults the list of the available VCI values and assigns an unused VCI value, say, "89" to the incoming A cells. Thus, as indicated in rows 301 and 302 of table 300, switch 107-2 translates the VCI value of incoming A cells to "89" for all outgoing links including links 111 and 113.

Similarly, after terminal 101-4 joins network 103, the processor in switch 107-2 assigns to the incoming B cells a VCI value, say, "90" from the available VCI list, which excludes "89" as it was previously assigned to the A cells. Accordingly, entry 303 is created in VC table 300. As a result, the A and B cells on link 115 extending to receiving terminal 101-2 carry their respective, different VCI values. Relying on the difference in their VCI values, terminal 101-2 can distinguish the incoming cells as being from different sources. Consequently, the otherwise VCI collision described above is avoided.

Continuing the above example, switch 107-3 in FIG. 1 receives the A cells from link 113 at in-port 1 thereof and B cells from link 117 at in-port 3. Switch 107-3 is a merge point since at least one outgoing link (e.g., link 119) therefrom may transport cells from two or more incoming links (e.g., links 113 and 117). Thus, in accordance with the invention, as a merge point, switch 107-3 locally maintains a list of available VCI values, and a VC table similar to table 300. The VCI values assignable by switch 107-3 in this instance are from "40" to "60." In addition, switch 107-3 performs VC switching in which both the VPI and VCI values of the incoming cells are translated. In this instance, the VPI and VCI values of the A cells from link 113 are translated to "50" and "51," respectively; the VPI and VCI values of a first copy of the B cells from link 117 are translated to "140" and "44," respectively; and the VPI and VCI values of a second copy of the B cells are translated to "50" and "44," respectively.

The A cells and second copy of B cells traverse link 119 identified by the VPI value "50." Link 119 extends to switch 107-4 which is not a merge point in this example. Thus, in accordance with the invention, switch 107-4 performs VP switching in which only the VPI values of the incoming A and B cells are translated. As a result, the A and B cells are switched onto link 121 identified by a VPI value "60" and bear the same VPI value (i.e. 60) on link 121. Again, because of the different VCI values of the respective A and B cells on link 121, terminal 101-3 can distinguish the incoming cells as being from different sources.

To implement the inventive scheme, a mechanism is needed to indicate to each merge point that a new transmitting terminal has joined the network so that the merge point can create the appropriate entries in a VC table beforehand. This mechanism may be realized by transmitting a signaling message through a signaling channel during the call setup. A merge point receiving the signaling message creates the appropriate VC table entries and forwards the signaling message to neighboring merge points. However, the newly-joined terminal can only transmit ATM cells after all the merge points receive the signaling message, thus incurring an undesirably large setup latency. In addition, when a terminal disconnects from the network, another signaling message is required to inform the merge points to clear the corresponding VC table entries. The previously assigned VCIs in such entries can then be returned to the available VCI lists.

Alternatively, a control cell may be used to indicate to the merge points that a new terminal has joined the ATM network. After a call setup but prior to sending any data cells, the new terminal transmits the control cell through the same data channels as the data cells. The control cell has the same VPI and VCI values as the data cells and acts as a "dummy" data cell. Since the control cell is transmitted before any data cells, it reaches each merge point before the data cells. Upon receiving the control cell, the merge point checks its set of VPI and VCI values against those sets currently registered in the "IN" column of the VC table described before. If the received set is different from each of the registered sets, the merge point determines that a new transmitting terminal has joined the network, and accordingly creates appropriate entries in the VC table. The control cell and the data cells subsequent thereto bearing the same VCI value are VC switched by the merge point according to the new table entries. To reduce the risk of losing the control cell, more than one control cell may be sent.

To efficiently maintain the entries of the VC tables, a transmitting terminal being disconnected from the network needs to send another control cell indicating the disconnection. Upon receiving one such control cell, a merge point deletes the entries corresponding to the disconnected terminal from its VC table.

Alternatively, the table entries are maintained by treating each entry as a "soft entry." Such a soft entry needs to be refreshed by incoming cells having the VPI/VCI set corresponding to the entry. Specifically, each entry has a timer associated therewith and is assigned a predetermined time-out period. For each registered VPI/VCI set in the table, the corresponding entry is deleted from the table if the merge point has not received any incoming cell having that registered VPI/VCI set within the time-out period. Otherwise if the merge point receives at least one such incoming cells within that period, the associated timer is renewed and the time-out period restarts. As such, when a transmitting terminal is disconnected from the network and no longer transmits any cells, the corresponding entries in the VC tables will be automatically timed out and deleted.

In the above "VCI Collision Avoidance" approach, each merge point in a multicast connection is required to perform VC switching to effectively avoid VCI collisions. However, in another approach described below, which is referred to as a "VCI Collision Detection" approach, all the switches in a multicast connection including merge points initially perform VP switching. Only when a VCI collision is detected, would a merge point dynamically dispense VC switching to incoming cells from a particular link including the cells which would otherwise be involved in the collision. When the cause of the VCI collision disappears, the merge point reverts to VP switching for the incoming cells in question. Among other advantages, as a merge point in the detection approach needs to maintain VC entries for only those incoming links carrying cells which would otherwise be involved in collisions, as opposed to each incoming link in the avoidance approach, the size of the VC table, if any, maintained by a merge point in the detection approach is smaller than that in the avoidance approach.

Figure 4:
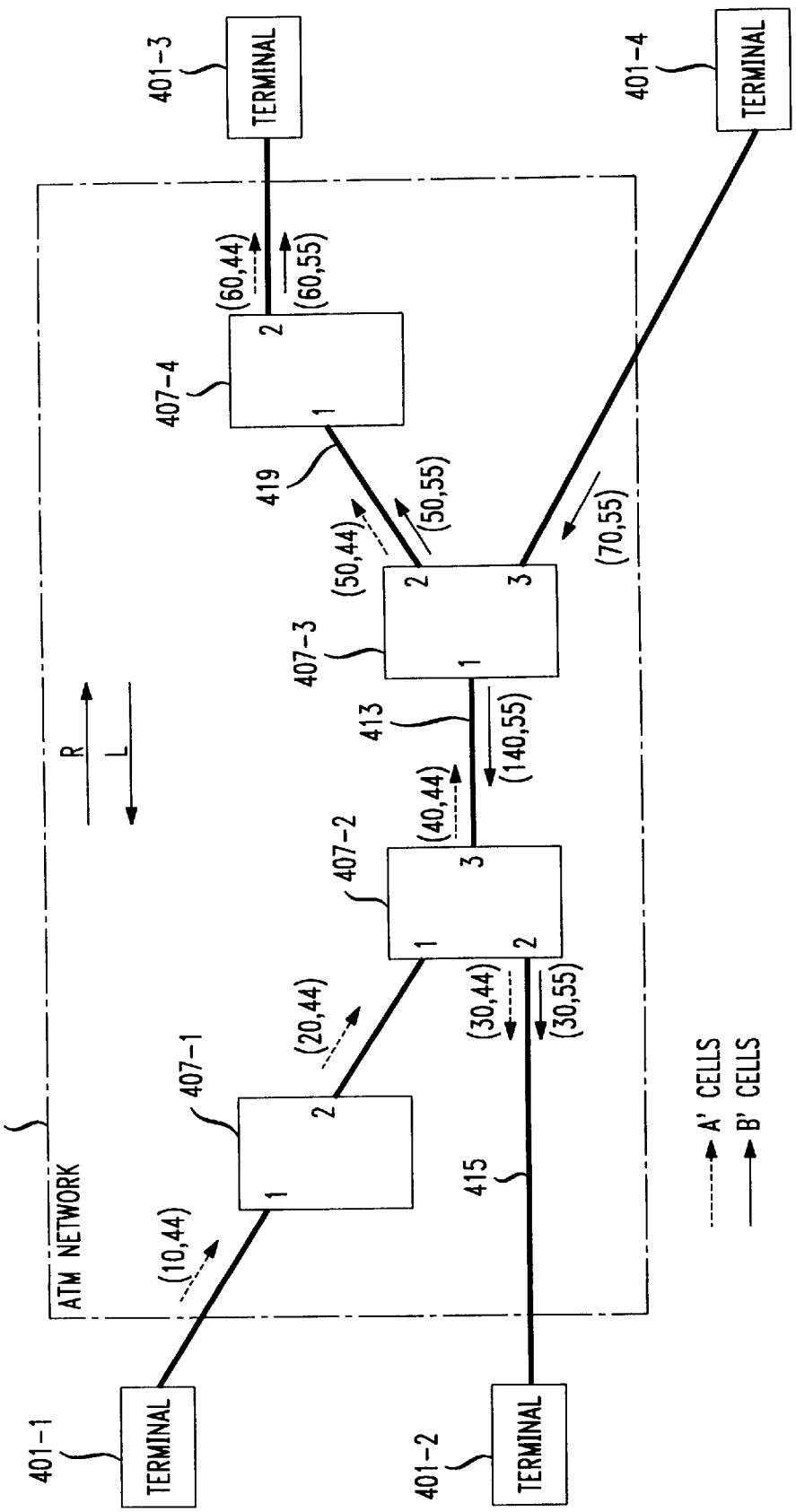
FIG. 4 is a block diagram of an ATM communications system in accordance with an invention VCI collision detection approach.

FIG. 4 illustrates communication system 400 in accordance with the VCI collision detection approach. System 400 includes ATM network 403 in a multipoint-to-multipoint configuration, which is similar to network 103. In the instant multicast connection, terminals 401-1 and 401-4 transmit ATM cells to network 403 and are thus transmitting terminals. On the other hand, terminals 401-2 and 401-3 receive ATM cells from network 403 and are thus receiving terminals. Again, terminals 401-1 through 401-4 are engaged in a multicast connection since each of the receiving terminals receives ATM cells from more than one transmitting terminal.

In this instance, all links in network 403 are unidirectional except links 413 and 419 which are bidirectional. As shown in FIG. 4, the travel direction of the cells from terminal 401-1 on each link is indicated by a dash-line arrow. Cells from terminal 401-1 hereinafter are referred to as "A' cells." In addition, the travel direction of the cells from terminal 401-4 on each link is indicated by a solid-line arrow. Cells from terminal 401-4 hereinafter are referred to as "B' cells."

According to the VCI collision detection approach, each of ATM switches 407-1 through 407-4 in accordance with the invention performs VP switching when no VCI collision is detected, which is the case of system 400. In particular, switches 407-2 and 407-3 which are merge points, maintain only VP tables at their respective out-ports. For example, FIGS. 5A and 5B illustrate VP tables maintained by switch 407-2 at its out-port 2 and out-port 3, respectively.

Referring to row 501 in FIG. 5A, switch 407-2 translates the VPI value "20" of cells arriving at in-port 1 to "30." In addition, referring to row 502, switch 407-2 translates the VPI value "140" arriving at in-port 3 to "30." All these cells after the VPI translation are sent off through out-port 2 to link 415 identified by the VPI value "30".

Referring to row 503 in FIG. 5B, switch 407-2 translates the VPI value "20" of copies of A' cells arriving at in-port 1, and sends the translated cells off, through out-port 3, to link 413 in direction R which is identified by the VPI value "40." Similarly, FIGS. 6A and 6B illustrate the VP tables maintained by switch 407-3 at its out-port 1 and out-port 2, respectively.

In implementing the VCI collision detection approach, each directional link in network 403 is identifiable by two VPI values. By way of example, one of the VPI value is odd, and the other is even. When no collision is detected, which is the case of system 400, only the even VPI values are used to identify the links. When a collision is detected, selected links are also identified by their respective odd VPI values. For example, link 413 in direction R is identifiable by VPI values "40" (an even number) and "41" (an odd number). Link 413 in direction L is identifiable by VPI values "140" and "141."

Turning now to FIG. 7, communications system 700 includes ATM network 403 described before. However, compared with system 400, system 700 includes additional transmitting terminals denoted 401-5 and 401-6. In this illustration, let's assume that terminals 401-5 and 401-6 after joining the multicast connection start transmitting cells to network 403 almost simultaneously.

In accordance with the routing established during a call setup, the travel direction of cells from terminal 401-5 on each link is indicated by a solid-line arrow with a hollow arrowhead. Cells from terminal 401-5 hereinafter are referred to as "C' cells." In addition, the travel direction of cells from terminal 401-6 is indicated by a dash-line arrow with a hollow arrowhead. Cells from terminal 401-6 hereinafter are referred to as "D' cells."

It should be noted that because of the additional incoming links extending from transmitting terminals 401-5 and 401-6 to switches 407-1 and 407-4, respectively, they now become merge points, along with switches 407-2 and 407-3.

Preferably, the merge point closest to a transmitting terminal assigns an initial VCI value "unseen" by the merge point to the cells generated by the terminal to avoid a VCI collision at that merge point. Each merge point in network 403 locally maintains in a memory (not shown) a list of VCI values currently used by incoming cells. Switch 407-1, in this instance the closest merge point to terminal 401-5, assigns an unused initial VCI value, say, "66" to the C' cells. Coincidentally, switch 407-4, the closest merge point to terminal 401-6, assigns an identical initial VCI value (i.e., "66") to the D' cells.

In accordance with the invention, in order to detect any VCI collision, terminals 401-5 and 401-6 first transmit to the network respective START control cells (hereinafter START C' and START D' cells) having the initial VCI value. Because by design no collision would occur at switch 407-1, the START C' cell from terminal 401-5 is VP switched by switch 407-1 onto link 411, which extends to switch 407-2. After receiving such a control cell, switch 407-2, as a merge point, checks the VCI value "66" of the received control cell against the list of VCI values used by other incoming cells. Assuming that the START D' cell from terminal 401-6 is en route and has not yet reached switch 407-2, the latter determines that the VCI value "66" is new. Thus, switch 407-2 detects no VCI collision, and adds "66" to its used VCI list.

The presence or absence of a collision detected by a merge point is required to be communicated to the preceding merge point. Accordingly, switch 407-2 sends to switch 407-1 an ACK cell indicating no collision at that point. In response to such an ACK cell, switch 407-1 starts VP switching C' data cells onto link 411.

The START C' cell is forwarded by switch 407-2 to succeeding merge points in accordance with the established routing. In this instance, the only succeeding merge point is switch 407-3. Again, the latter checks the VCI value of the START C' cell against its used VCI list. Assuming that the START D' cell has already been processed by switch 407-3, the VCI list in question contains a VCI value "66" attributed to the START D' cell. Noticing that the received START C' cell has a VCI value (i.e., "66') which is "seen", switch 407-3 determines that a VCI collision has occurred. Accordingly, switch 407-3 sends to the preceding merge points (only switch 407-2 in this instance) an ACK cell indicating that a collision has been detected. In response to such an ACK cell, switch 407-2 modifies VP entry 103 in FIG. 5B. Specifically, the VPI value "20" is no longer to be translated to "40" but to its odd counterpart "41," as indicated in FIG. 8.

In accordance with the invention, although an even VPI value and its odd counterpart identify the same link, cells having the even VPI value are VP switched by a receiving merge point. On the other hand, cells having its odd counterpart as the VPI value are VC-switched by same. After modifying the VP entry, switch 407-2 starts VP switching the C' data cells onto link 413 in the R direction, which is identified by the translated VPI value "41".

Upon detecting a collision involving the START C' cell arriving at its in-port 1, switch 407-3 creates a VC table concerning the cells having the odd VPI value on link 413 terminating at that port. FIG. 9 illustrates such a VC table. Switch 407-3 then performs VC switching on the received cells according to the table of FIG. 9. In particular, switch 407-3 translates the colliding VCI value "66" of the START C' cell (and the subsequent C' data cells) to "89" to prevent further collisions. For the A' cells having a non-colliding VCI value "44", the same value is used as the translated VCI value in this instance. The START C' cell having the translated VCI value is then forwarded by switch 407-3 to an appropriate link according to the established routing. Any VCI collision detected in the succeeding merge points is resolved in a manner described above.

When transmitting terminal 401-6 joins network 403, new VP table entries at switches 407-3 and 407-4 are added for VP switching the D' cells. For example, compared with FIG. 6A, entry 1001 has been added by switch 407-3 to the VP table in FIG. 10 concerning the D' cells arriving at in-port 2 and exiting at out-port 1. In accordance with entry 1001, the VP translation of the D' cells is from "150" identifying link 419 in the L direction to "140" identifying link 413 in the L direction.

Similar to the START C' cell, the START D' cell initially from terminal 401-6 is VP-switched by switch 407-4 to link 419, which extends to switch 407-3. Assuming that at that point the START C' cell is en route and has not yet reached switch 407-3, the latter determines that the VCI value "66" of the control D' cell is "unseen." Thus, switch 407-3 detects no VCI collision, and adds "66" to its used VCI list. The START D' cell is then VP switched by switch 407-3 to succeeding merge points. In this instance, the only succeeding merge point is switch 407-2. At this point, because of the earlier receipt of the START C' cell, switch 407-2 has "seen" the VCI value "66" according to its used VCI list. Accordingly, switch 407-2 sends to the preceding merge point (i.e. switch 407-3) an ACK cell indicating that a collision has been detected. In response to such an ACK cell, switch 407-3 changes VP entry 1001 in FIG. 10 to entry 1101 in FIG. 11. That is, the VPI value of all cells including D' data cells from incoming link 419 is no longer translated to "140" but, rather, to its odd counterpart "141."

Upon detecting a collision involving the START D' cell arriving at its in-port 3, switch 407-2 creates a VC table concerning cells having the odd VPI value "141" coming in from that port. FIG. 12 illustrates such a VC table. Switch 407-2 then performs VC switching on the START D' cell according to the table of FIG. 12. In particular, switch 407-2 translates the colliding VCI value "66" of the START D' cell (and the subsequent D' data cells) to "78" to prevent further collisions. The START D' cell having the translated VCI value is then forwarded by switch 407-2 to an appropriate link according to the established routing. Any VCI collision detected in the succeeding merge points is resolved in a manner described above.

The disposition of VC switching after the cause of a VCI collision disappears will now be described. For example, right before transmitting terminal 401-5 ceases to transmit, it sends to switch 407-1 an END control cell (hereinafter the "END C' cell") indicating the end of transmission. After VP switching such a cell to switch 407-2, switch 407-1 deletes the VP table entries concerning the C' cells. Switch 407-2, as a merge point, compares the VCI value of the received END C' cell against the used VCI list, and determines that the above VCI collision ceases to exist. Switch 407-2 further determines that the odd VPI value corresponding to the previously colliding VCI value in the VC table of FIG. 12 can be changed to its even counterpart (i.e., from 141 to 140). Switch 407-2 then VP switches the END C' cell to the succeeding merge point, which is switch 407-3. In addition, switch 407-2 sends to switch 407-3 an ACK cell indicating that the VPI value "141" should be reverted to its even counterpart "140". In response, switch 407-3 changes the VP table of FIG. 11 back to that of FIG. 10. It then sends a return ACK cell to switch 407-2. In response, switch 407-2 deletes the VC table of FIG. 12 having entries concerning VPI=141, and reverts to a pure VP-switching mode.

After receiving the END C' cell, switch 407-3 also determines that the VCI collision ceases to exist. It VP switches the END C' cell, and sends to switch 407-2 an ACK cell indicating that the VPI value "41" should be reverted to its even counterpart "40." In response, switch 407-2 changes the VP table of FIG. 8 back to that of FIG. 5B. Switch 407-2 then sends a return ACK cell to switch 407-3. In response, switch 407-3 deletes the VC table of FIG. 9 having entries concerning VPI=41, and reverts to a pure VP switching mode.

The foregoing merely illustrates the principles of the invention. It will thus be appreciated that a person skilled in the art will be able to devise numerous systems which, although not explicitly shown or described herein, embody the principles of the invention and are thus within its spirit and scope.

For example, the communication systems disclosed herein are in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. Apparatus for switching information cells, each information cell including an identifier, comprising:
   a control for switching at least a first stream of information cells in a multicast connection, the information cells in the first stream being switched according to a first switching mode, the identifier of each information cell in the first stream having a selected value;
   a first mechanism for detecting a collision in the multicast connection when a second stream of information cells to be switched include the respective identifiers having the selected value, the collision being detected based on a receipt by the apparatus of a control element preceding the information cells in the second stream, the control element including the identifier having the selected value; and
   a second mechanism responsive to the collision for causing the information cells in the second stream to be switched according to a second switching mode.

2. The apparatus of claim 1 wherein each information cell is formatted according to an ATM scheme.

3. The apparatus of claim 2 wherein the identifier includes a VCI.

4. The apparatus of claim 2 wherein the first switching mode is a virtual path (VP) switching mode and the second switching mode is a virtual channel (VC) switching mode.

5. The apparatus of claim 1 wherein the second mechanism includes means for causing the information cells in one of the first and second streams to be modified.

6. The apparatus of claim 5 wherein the second mechanism further includes means for informing a second switching apparatus of the collision, the second switching apparatus processing the information cells in the second stream.

7. The apparatus of claim 6 wherein the second switching apparatus modifies each of the information cells in the second stream in response to the collision.

8. The apparatus of claim 6 wherein each information cell in the second stream includes a second identifier having a second selected value, the second switching apparatus modifying the second selected value of the second identifier of each information cell in the second stream in response to the collision.

9. The apparatus of claim 8 wherein each information cell in the second stream is formatted according to an ATM scheme, the second identifier including a VPI.

10. The apparatus of claim 9 wherein both the second selected value and the modified second selected value of the second identifier identify an identical link.

11. The apparatus of claim 1 further comprising a third mechanism for detecting a removal of a cause of the collision.

12. The apparatus of claim 11 further comprising means for causing the information cells in the second stream to be switched according to the first switching mode upon detecting the removal of the cause of the collision.

13. A method for use in an apparatus for switching information cells, each information cell including an identifier, the method comprising:
   switching at least a first stream of information cells in a multicast connection, the information cells in the first stream being switched according to a first switching mode, the identifier of each information cell in the first stream having a selected value;
   detecting a collision in the multicast connection when a second stream of information cells to be switched include the respective identifiers having the selected value, the collision being detected based on a receipt by the apparatus of a control element preceding the information cells in the second stream, the control element including the identifier having the selected value; and
   in response to the collision, causing the information cells in the second stream to be switched according to a second switching mode.

14. The method of claim 13 wherein each information cell is formatted according to an ATM scheme.

15. The method of claim 14 wherein the identifier includes a VCI.

16. The method of claim 14 wherein the first switching mode is a virtual path (VP) switching mode and the second switching mode is a virtual channel (VC) switching mode.

17. The method of claim 13 wherein the causing step includes the step of causing the information cells in one of the first and second streams to be modified.

18. The method of claim 17 further comprising informing a second switching apparatus of the collision, the second switching apparatus processing the information cells in the second stream.

19. The method of claim 18 wherein each of the information cells in the second stream is modified by the second switching apparatus in response to the collision.

20. The method of claim 18 wherein each information cell in the second stream includes a second identifier having a second selected value, the second selected value of the second identifier of each information cell in the second stream being modified by the second switching apparatus in response to the collision.

21. The method of claim 20 wherein each information cell in the second stream is formatted according to an ATM scheme, the second identifier including a VPI.

22. The method of claim 21 wherein both the second selected value and the modified second selected value of the second identifier identify an identical link.

23. The method of claim 13 further comprising detecting a removal of a cause of the collision.

24. The method of claim 23 further comprising causing the information cells in the second stream to be switched according to the first switching mode upon detecting the removal of the cause of the collision.

25. A system for transporting information cells, each information cell including first and second identifiers each having a value, the system comprising:

a first switch including at least one output port, and at least one input port for receiving a first stream of information cells, the first switch switching the first stream of information cells from the at least one input port to the at least one output port, the first switch changing the value of only one of the first and second identifiers of each information cell in the first stream; and a second switch connected to the first switch, the second switch including at least one output port, and a plurality of input ports for receiving at least second and third streams of information cells, the second switch switching the second and third streams from the plurality of input ports to the at least one output port in the second switch, the second switch changing the values of both the first and second identifiers of each information cell in the second and third streams.

26. The system of claim 25 wherein the second switch includes a repository for providing available second identifier values, the value of the second identifier of each cell in the second stream being changed to a selected one of the available second identifier values.

27. The system of claim 26 wherein the second switch further includes a mechanism for identifying a beginning of a stream of information cells received thereby.

28. The system of claim 27 wherein the value of the second identifier is changed by the second switch upon identifying the beginning of the second stream of information cells.

29. The system of claim 26 wherein the second switch further includes a mechanism for determining a termination of a stream of information cells received thereby.

30. The system of claim 29 wherein the selected second identifier value is added to a collection of the available second identifier values upon determining the termination of the second stream of information cells.

31. The system of claim 29 wherein the mechanism determines the termination of the second stream of information cells after any information cell from the second stream is not received for more than a predetermined period.

32. The system of claim 25 wherein each information cell is formatted according to an ATM scheme.

33. The system of claim 32 wherein the first identifier includes a VPI.

34. The system of claim 32 wherein the second identifier includes a VCI.

35. A method for use in a system for transporting information cells, the system comprising a first switch including at least one output port, and at least one input port for receiving a first stream of information cells, the system also comprising a second switch connected to the first switch, the second switch including at least one output port, and a plurality of input ports for receiving at least second and third streams of information cells, each information cell including first and second identifiers each having a value, the method comprising:

switching the first stream of information cells from the at least one input port of the first switch to the at least one output port thereof;

changing the value of only one of the first and second identifiers of each information cell in the first stream;

switching the second and third streams from the plurality of input ports of the second switch to the at least one output port thereof; and changing the values of both the first and second identifiers of each information cell in the second and third streams.

36. The method of claim 35 further comprising providing available second identifier values, the value of the second identifier of each cell in the second stream being changed to a selected one of the available second identifier values.

37. The method of claim 36 further comprising identifying a beginning of a stream of information cells received by the second switch.

38. The method of claim 37 wherein the value of the second identifier is changed upon identifying the beginning of the second stream of information cells received by the second switch.

39. The method of claim 36 further comprising determining a termination of a stream of information cells received by the second switch.

40. The method of claim 39 wherein the selected second identifier value is added to a collection of the available second identifier values upon determining the termination of the second stream of information cells received by the second switch.

41. The method of claim 39 wherein the termination of the second stream of information cells is determined after any information cell from the second stream is not received for more than a predetermined period.

42. The method of claim 35 wherein each information cell is formatted according to an ATM scheme.

43. The method of claim 42 wherein the first identifier includes a VPI.

44. The method of claim 42 wherein the second identifier includes a VCI.

* * * * *